Sept. 8, 1953     H. H. FELDSTEIN ET AL     2,651,126
PAGE CARD FILE
Filed March 1, 1948     3 Sheets-Sheet 1
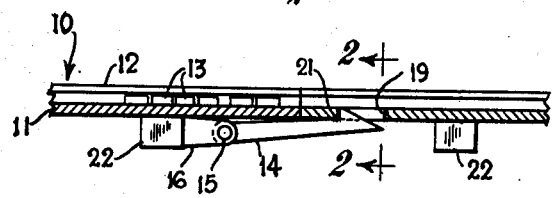
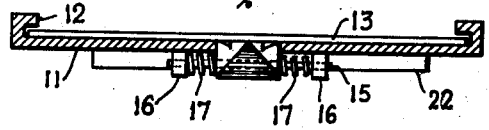 
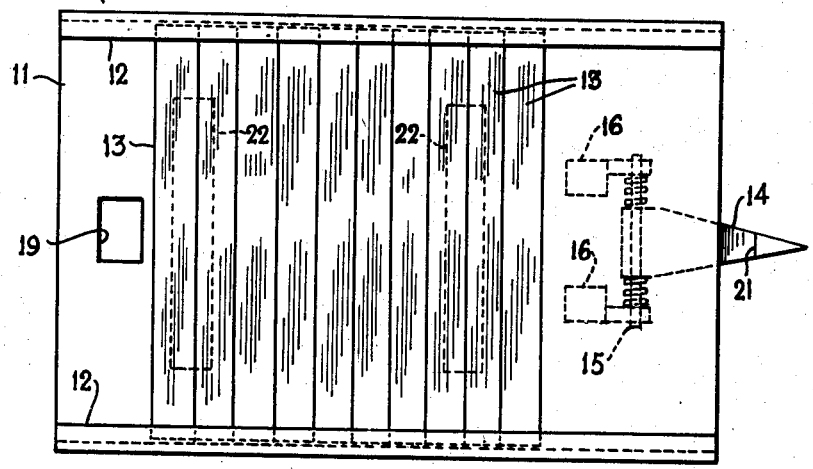
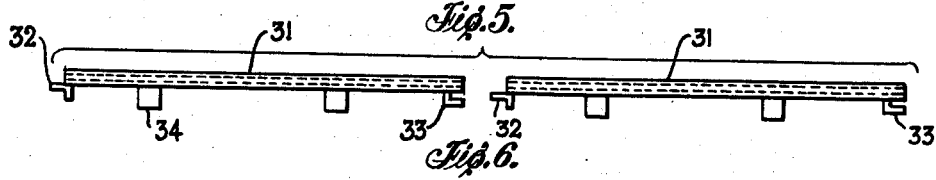
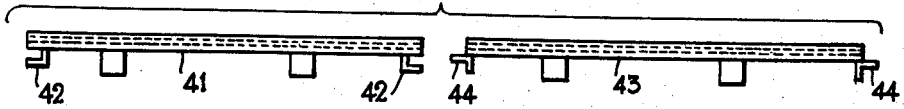
INVENTOR
HENRY H. FELDSTEIN
AND
MARC J. FELDSTEIN
BY
West & Oldham
ATTORNEYS Sept. 8, 1953     H. H. FELDSTEIN ET AL     2,651,126
PAGE CARD FILE
Filed March 1, 1948     3 Sheets-Sheet 2
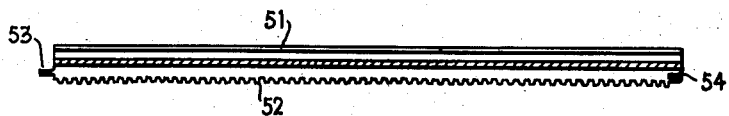
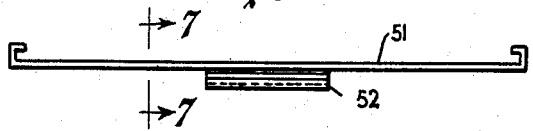
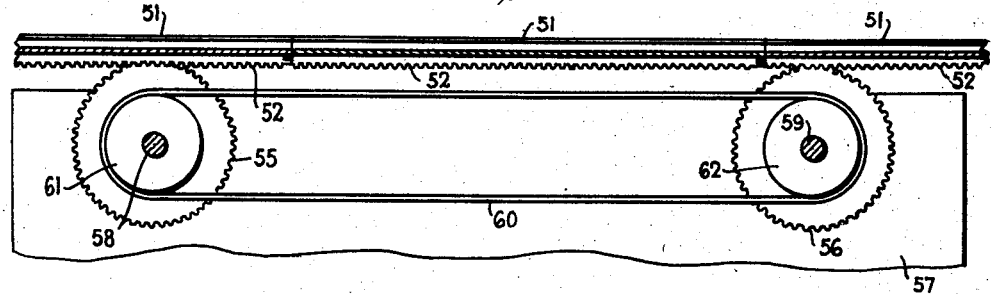
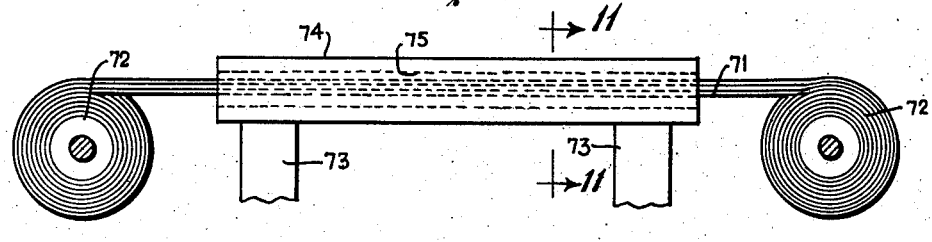
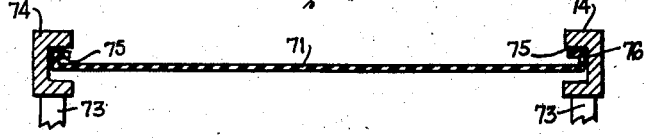
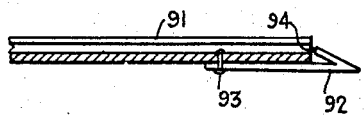 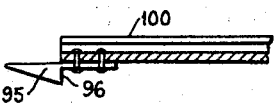
INVENTOR
HENRY H. FELDSTEIN
AND
MARC J. FELDSTEIN
BY
*West & Oldham*
ATTORNEYS Sept. 8, 1953   H. H. FELDSTEIN ET AL   2,651,126
PAGE CARD FILE
Filed March 1, 1948   3 Sheets-Sheet 3

Inventor
HENRY H. FELDSTEIN
AND
MARC J. FELDSTEIN
By West & Oldham
Attorneys

Patented Sept. 8, 1953

2,651,126

UNITED STATES PATENT OFFICE 2,651,126

PAGE CARD FILE

Henry H. Feldstein, Cleveland, Ohio, and Marc J. Feldstein, Arlington, Va.

Application March 1, 1948, Serial No. 12,388

4 Claims. (Cl. 40—64)

1

This invention relates to page card files, especially to page card files that carry transversely directed data-bearing strips and that are adapted to be associated in end-to-end abutting relation, or to be originally formed, so as to provide an endless or continuous page card file.

In our previous application, since matured into U. S. Patent No. 2,541,753, we have provided apparatus for moving transversely extending data-bearing cards, carried by page card files, with relation to the page card file. That is, the page card file or files position a plurality of transversely extending data-bearing strips and the previous application provides apparatus whereby relative movement between such cards or strips and the page card files can be occasioned to adapt the page card files for insertion or removal of various data-bearing strips; and the repositioning of the then carried data-bearing strips so as to put them in a desired portion of a given page card file.

Inasmuch as the usual page card files provided at this time are separate boards, without means of moving them, it is especially important that means be provided for moving these boards and for associating such boards in fixed end-to-end abutting relation to permit transfer of data-bearing strips from one specific file to another with changes in the number of strips to be mounted in a given page card file system.

The general object of the present invention is to provide a novel, improved type of page card file especially adapted for mechanical movement of data-bearing strips longitudinally of the page card file.

Another object of the invention is to provide a continuous, flexible page card file that is adapted to be rolled or coiled upon itself for storage purposes.

A further object of the invention is to provide a plurality of separate page card files that can be detachably locked into endwise abutting engagement, when desired.

Another object of the invention is to provide uncomplicated means for rigidly engaging associated ends of two page card files.

A further object of the invention is to provide positive means for driving page card files longitudinally.

Another object of the invention is to secure data strips in page card files automatically when such files are individually or collectively positioned.

The foregoing and other objects and advantages of the present invention will be made apparent as the specification proceeds.

2

Attention is directed to the accompanying drawings, wherein:

Fig. 1 is a fragmentary longitudinal section through page card files embodying the principles of the invention;

Fig. 2 is a section taken on the line 2—2 of Fig. 1;

Fig. 3 is a plan of a page card file of Fig. 1;

Fig. 4 is an end elevation of the spring shown in Fig. 2;

Figs. 5 and 6 are side elevations of modified types of page card files;

Fig. 7 is a longitudinal section of a further modified type of page card file of the invention taken on line 7—7 of Fig. 8;

Fig. 8 is an end elevation of the page card file of Fig. 7;

Fig. 9 is a longitudinal section indicating one manner of moving page card files of the type shown in Figs. 7 and 8 through a longitudinal path;

Fig. 10 is a side elevation of a continuous page card file and edge support means therefor removed;

Fig. 11 is a section taken on the line 11—11 of Fig. 10;

Fig. 12 is a fragmentary longitudinal section of another page card file of the invention;

Fig. 13 is a fragmentary longitudinal section of a further type of page card file particularly suited for use with the file of Fig. 12;

Figure 15:
Figure 16:
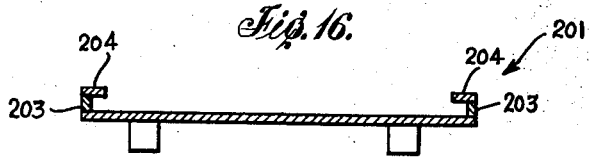
Figure 17:
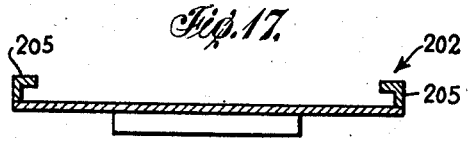

Figs. 15, 16, and 17 are transverse sections of further types of page card files.

Reference now is made to the details of the structures shown in the accompanying drawings and a page card file 10 is shown in Fig. 1 which file is formed from a relatively flat, substantially rectangularly shaped base portion 11 which has a pair of inwardly directed, opposed overhanging flanges 12 formed on the lateral margins thereof, usually integrally with the base portion 11. The flanges 12 are adapted to receive and retain thereunder the data bearing strips 13 which are carried by the page card file 10 and extend transversely thereof, as best shown in Fig. 3. Any desired number of data bearing strips may be carried by the page card file 10 up to the number of strips that fill same completely, and it is frequently necessary in using systems of this type to move such strips 13 with relation to the page card file as strips are to be added to or removed from the file system.

In order to facilitate ready transmittal of data bearing strips from one page card file to another, it is usually desirable that two or more page card files 10 be secured together in end-to-end abutting relation. To this end, a locking finger or arm 14 is pivotally carried on a mounting shaft or arbor 15 which is journalled in or otherwise supported by a pair of mounting brackets 16 that are suitably secured to the under surface of the base portion 11, as best shown in Fig. 2. The mounting brackets 16 are spaced laterally from the lock arm 14, which may be of any desired contour, and one or more coil springs 17 having extensions 18 protruding from one end thereof are carried by the mounting shaft 15 in telescoped association therewith. The extensions 18 are adapted to bear upon the base portion, or one end of the spring is fastened to the base 11 whereas opposite end portions of the coil spring 17 are fixedly associated with the lock arms 14 whereby the coil spring 17 will continuously urge the lock arms upwardly with relation to the base portions of the page card files and spring them back against the files after they are pulled away from the files.

Each of the page card files 10 is provided with a locking device which is shown in the form of a recess or slot 19 provided therein at the end section thereof remote from that with which the lock arm 14 is associated. Hence the lock arm 14 of the one page card file is adapted to engage with the slot 19 in a second page card file that is in end-to-end abutting relation with the first page card file. A shoulder 21, formed on the lock arm 14, is adapted to engage with the slot 19, as indicated in Fig. 1, to retain a pair of page card files in association. Preferably the lock arm 14, and shoulder 21, are of appreciable width so as to give a relatively rigid, sturdy connecting means between associated page card files and to lock the strips 13 in the files when they are separated.

Downwardly extending lugs 22 are secured in a conventional manner to longitudinally spaced portions of the lower surface of the base portion 11 of the page card files. These lugs 22 extend transversely of the page card files and are adapted to be engaged by sprockets or other drive means for moving the page card files longitudinally through a desired path.

Figs. 5 and 6 show another type of end engagement means for page card files and in this instance a page card file 31 is provided with a tongue engagement member 32 associated with and protruding beyond the lower surface of the page card file at one end thereof whereas a groove member 33 is secured to the opposite end of the page card file on the lower surface thereof. Hence, the tongue 32 from one page card file can be engaged with the groove member 33 of a second page card file and retain the files in end-to-end abutting relationship. The tongue and groove members could be as wide as the files 31, if desired. The page card files 31 are also provided with transversely extending lugs 34 suitably secured to their lower surfaces for engagement with driving means.

In Fig. 6, a page card file 41 is shown which carries groove members 42 at each end thereof whereas a cooperating page card file 43 is provided with tongue members 44 at each end thereof, which members are suitably secured to the lower surfaces of the page card files 41 and 43 with the tongue members 44 protruding longitudinally beyond the data receiving portion of the file 43. In the constructions shown in Figs. 5 and 6, one important function of the cooperating tongue and groove elements is that they align the files at the same level and this may be the only function of same in some instances when the files are not secured together thereby.

In some instances it may be desirable to drive the associated page card files longitudinally in a positive manner. Thus Fig. 7 shows a page card file 51, generally similar to the files 10, which is provided with a rack 52 formed on, or suitably secured to, the lower surface of the page card file 51. Fig. 7 best shows that the rack 52 is provided with a tongue portion 53 extending from one end thereof whereas a groove 54 is formed in the opposite end thereof whereby a plurality of page card files 51 can be associated in end-to-end abutting relationship by engagement of the tongues and grooves of aligned and associated page card files. Of course the tongues and grooves may be eliminated when desired.

Fig. 9 shows means for use in moving the files 51 and that gears 55 and 56 can be carried on a frame 57 and be positioned on shafts 58 and 59 that are mounted in the frame 57. A belt 60 may connect the shafts 58 and 59 by means of pulleys 61 and 62 that are secured to and carried by the shafts 58 and 59. Any suitable driving means (not shown) are provided for one of the shafts 58 or 59 whereby the gears 55 and 56 may be driven in unison and cause a positive longitudinal movement of the page card files 51, the racks 52 of which engage with such gear means. Sometimes only one gear will be driven since the files 51, being abutted, will readily transmit a pushing force therethrough. Any desired frame means, such as those shown in Figs. 10 and 11, may also be associated with the apparatus shown in Fig. 9 to limit the lateral movement of the page card files 51 and position them for longitudinal movement through a given path.

Figs. 10 and 11 are of interest as they show a continuous page card file 71 which is adapted to be coiled or rolled upon itself for storage purposes. In this instance, storage rolls 72 are provided for the page card file 71 and a frame 73 having spaced side portions 74 provided thereon positions the page card file 71 for movement through a fixed path in the general direction of the longitudinal axis of the file 71. The side members 74 of the frame 73 having no confining or obstructing portions of the frame provided therebetween so that an unobstructed center portion is provided in that section of the frame and the opposed faces of the side members 74 are provided with recesses 75 that extend longitudinally of the frame 73. These recesses 75 are adapted to receive the page card file 71 therein and engage with the edge portions thereof. Fig. 11 shows that the page card file 71 has overhanging inwardly extending flanges 76 formed on the lateral margins thereof. These flanges 76 are continuous and are adapted to receive transversely extending data bearing strips therebetween.

The page card file 71 may be formed from any suitable material and natural rubber, synthetic rubber or rubber-like material are substances which would be very satisfactory for use in forming the page card file 71. Lugs may be formed on the lower surface of the file 71 for engagement with driving means therefor, if desired.

Yet another modification of the invention is shown in Fig. 12 wherein a page card file 91 is provided with a lock arm 92 which is secured to the page card file 91 on the lower surface thereof by a rivet 93 or other device. The lock arms 92 protrude from each end of the files and are inherently urged resiliently toward the page card file 91. The lock arms 92 are doubled back on themselves at their ends to form shoulder portions 94 thereon which are adapted to engage with the ends of the page card files when they are separate from other similar page card files 91 to form an elongate page card file of the invention and automatically to retain data bearing strips in engagement with the file.

Fig. 13 shows another page card file 100 that has a lock member 95, with a shoulder portion 96 thereon, secured to and projected axially beyond the page card file. The file 100 is for use with the file 91 and when the two page card files are abutted in proper end-to-end relation, the lock arm 92 is adapted to be sprung over the lock member 95 with the shoulder portions 94 and 96 engaging to secure two page card files in abutted end-to-end relation. In all instances where page card files are in fixed end-to-end association, the lock means are adapted to be readily sprung apart whereby the page card files can be separated, when desired.

In all of the embodiments of the invention, after the page card files are associated to form a continuous member, and are to be processed to change the position of data bearing strips carride thereby, then any desired means, or combination of means, such as those shown in our above referred to application, may be associated with the page card files for changing the positions of the data bearing strips. Of course, the endless files are, in all embodiments of the invention, positioned in and driven, or moved through means of the type shown in Figs. 10 and 11. The various page card file sections are adapted to be secured in tight, smooth end-to-end relation to facilitate sliding strips from one section of the file to another.

From the foregoing, it will be apparent that several sectional page card files of the invention can be engaged with each other in end-to-end abutting relation so as to form an assembled elongate page card file which is the equivalent of the elongate page card file 71 shown in Figs. 10 and 11. Thus, data-bearing strips carried by the page card files can be freely slid longitudinally of the page card file assembly and be positioned in a desired place thereon with a change in the number of data-bearing strips being carried by the apparatus of the invention. Of course, the page card file 71 may be considered to be an assembled page card file in the same manner as a plurality of short page card files that are in end-to-end relationship.

Figure 14:
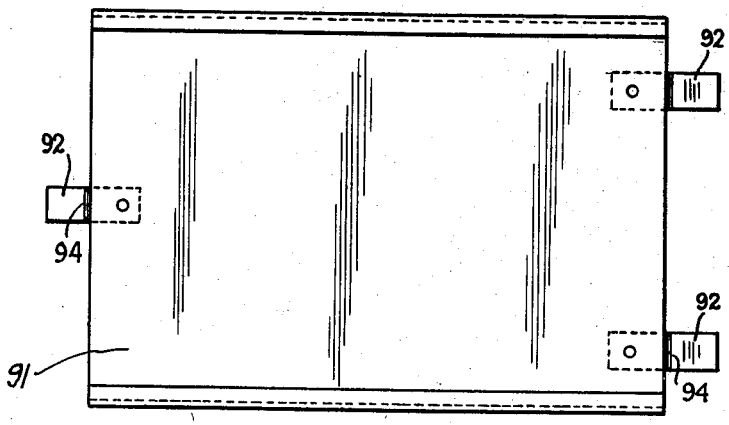
Fig. 14 is a plan of the file of Fig. 12.

It should be observed that the page card file shown in Fig. 12 has a special advantage in that the shoulder 94 formed on the lock arm 92 is of such height as to extend up over the base surface of the page card file 91 and retain data-bearing strips in engagement therewith, when the lock arm is in its normal position and the page card file 91 is not in engagement with the second page card file. Fig. 14 of the drawings shows that the file 91 has two spring arms 92 at one end thereof whereas only one arm is positioned at the center of the other end. The arms 92 would be automatically pressed in under the adjacent file when two files 91 are brought together.

Figs. 15, 16, and 17 show page card files 200, 201, and 202 with the base and flange of the file 200 being of the usual integral construction.

File 201 has spacer blocks 203 and flange strips 204 secured to its base in any desired manner while a flange block 205 is secured to the base of the file 202 at each side edge thereof.

It will be seen that motion may be transmitted through abutted files when they are or are not physically engaged. If the files tend to be of irregular contour, means such as are shown in Figs. 5 and 6 should be used to align the file ends to facilitate movement of cards from one file to another.

While the elongate file 71 is shown as being loosely received in the recesses 75 to be positioned thereby, a tighter fit may be used.

Having thus described our invention, what we claim is:

1. A page card file adapted to be engaged with other files in end-to-end relation for forming a continuous file, said file comprising a base member having edge flanges for engaging with data bearing strips, a lock arm extending longitudinally of the file adjacent one end thereof, means resiliently securing said lock arm to the lower surface of said base member, said lock arm extending beyond the end of said base member and having a shoulder adapted to engage therewith, and a lock finger associated with the opposite end of said file and adapted to engage with a lock arm of a second file in immediate end-to-end association therewith, said lock finger having a shoulder formed thereon for engagement with a shoulder on a lock arm of a second file.

2. A page card file as in claim 1 wherein said lock arm is positioned intermediate the lateral margins of said file and the shoulder of said lock arm is adapted to engage with the end of the page card file on which it is mounted to retain data-bearing strips in engagement with the file when the file is out of engagement with a second file.

3. In combination, at least a pair of page card files positioned in abutted end-to-end relation, said page card files each comprising a flat member having a pair of opposed overhanging flanges formed on opposite edges of the upper surface thereof to define a data strip receiving portion in the page card file, a spring member attached to the under surface of said flat member at each end thereof and protruding longitudinally from the data strip receiving portion of the file, said spring members being spaced from the longitudinal center line of said flat members and being spaced from the lateral margins thereof, said spring members having doubled back shoulder portions lying longitudinally outwardly of the flat member and protruding up immediately adjacent the ends of the said files at least into the data strip receiving portion of said files to prevent data strips from moving beyond the ends of said files, opposite ends of said files being abutted and the said spring members on the abutted ends being depressed below the lower surfaces of said files.

4. In combination, at least a pair of page card files positioned in abutted end-to-end relation, said page card files each comprising a flat member having a pair of opposed overhanging flanges formed on opposite edges of the upper surface thereof to define a data strip receiving portion in the page card file, at least one spring member attached to the under surface of said flat member at each end thereof and protruding longitudinally therefrom, said spring members being positioned out of longitudinal alignment with each other on any one of said files, said spring members having doubled back shoulder portions protruding up immediately adjacent the ends of the said files at least into the data strip receiving portion of said files to prevent data strips from moving beyond the ends of said files, said spring members on the abutted ends being depressed below the lower surfaces of said files.

HENRY H. FELDSTEIN.
MARC J. FELDSTEIN.

References Cited in the file of this patent

UNITED STATES PATENTS

| Number | Name | Date |
|---|---|---|
| 499,443 | Rudolph | June 13, 1893 |
| 853,528 | Wallace | May 14, 1907 |
| 995,466 | Jones | June 20, 1911 |
| 1,069,966 | Lutz et al. | Aug. 12, 1913 |
| 1,201,943 | De Ford | Oct. 17, 1916 |
| 1,210,670 | Millard | Jan. 2, 1917 |
| 1,450,850 | Grip | Apr. 3, 1923 |
| 1,462,390 | Staving | July 17, 1923 |
| 1,574,931 | Powell | Mar. 2, 1926 |
| 1,768,715 | Hopp | July 1, 1930 |
| 2,119,562 | Taddonio | June 7, 1938 |
| 2,124,698 | Harms | July 26, 1938 |
| 2,156,351 | Paul | May 2, 1939 |
| 2,200,533 | Borregard | May 14, 1940 |
| 2,210,452 | Garland et al. | Aug. 6, 1940 |
| 2,266,724 | Goldberg et al. | Dec. 16, 1941 |
| 2,363,725 | Graham | Nov. 28, 1944 |
| 2,419,802 | Van Horne | Apr. 29, 1947 |